(No Model.)
H. F. GALE & L. A. HAWLEY.
CABLE COUPLING.
No. 339,399. Patented Apr. 6, 1886.
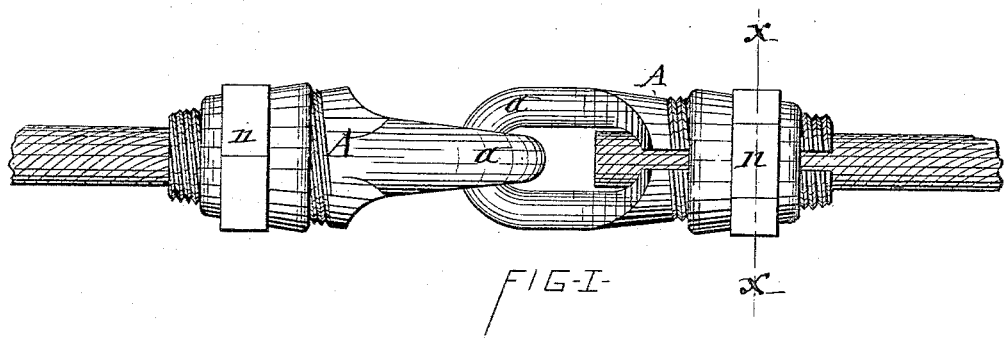
FIG-I-
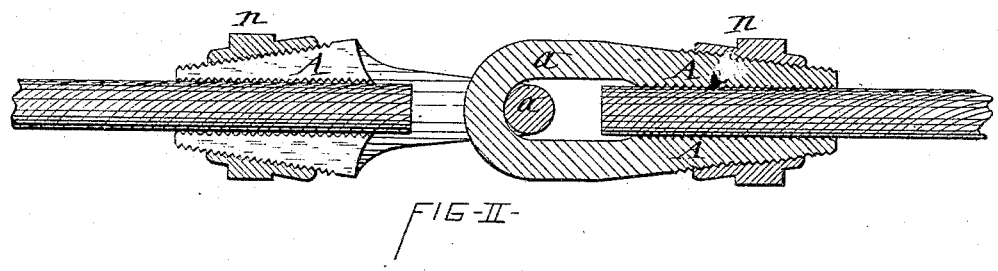
FIG-II-
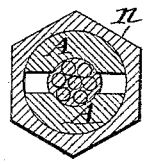
FIG-III-
WITNESSES
C. Bendixon
E. C. Cannon
INVENTORS
Henry F. Gale
Lewis A. Hawley

United States Patent Office.

HENRY F. GALE AND LEWIS A. HAWLEY, OF SYRACUSE, NEW YORK.

CABLE-COUPLING.

SPECIFICATION forming part of Letters Patent No. 339,399, dated April 6, 1886.

Application filed October 26, 1885. Serial No. 181,035. (No model.)

*To all whom it may concern:*

Be it known that we, HENRY F. GALE and LEWIS A. HAWLEY, of Syracuse, in the county of Onondaga, in the State of New York, have invented new and useful Improvements in Cable-Couplings, of which the following, taken in connection with the accompanying drawings, is a full, clear, and exact description.

This invention relates to the class of cable-couplings which have two jaws gripping between them the end of the cable, and a clamp embracing the jaws and tightening the same on the cable.

Our improvement consists in connecting the gripping-jaws together at one end by a flexible loop formed in one piece therewith, and tapering the jaws toward the opposite end and screw-threading them externally, and applying thereto a nut, which, by turning it toward the larger ends of the jaws, serves to tighten the same on the cable. By said improvement we obtain two spring-jaws, which are readily applied to a cable and made to firmly grip the same, and when applied it furnishes the end of the cable with a rigid loop by which to couple the cable either with another cable or connect it to a ring or hook on some other object.

The invention is fully illustrated in the annexed drawings, wherein Figure I is a side view of our improved coupling as applied for connecting two cables end to end. Fig. II is a longitudinal section of the same, and Fig. III is a transverse section on line *x x*, Fig. I.

A A represent two jaws, which have their adjacent sides recessed longitudinally, of semi-circular or segmental or any other suitable shape in cross-section, and serrated so as to obtain a secure hold on the sides of the cable, which they embrace between them, as shown. Said jaws are flexibly connected together at one end by a loop, *a*, which is integral or formed in one piece therewith, and allows the two jaws to be spread apart sufficiently to pass one of the jaws either through a ring or eye on the object to which the cable is to be connected, or through a similar loop on the end of a companion coupling applied to the end of another cable, as shown in Figs. I and II of the drawings. The jaws A A are tapered externally toward the opposite end and screw-threaded, and on the screw-threaded portion thereof works a nut, *n*. By turning the said nut toward the larger end of the jaws the latter become compressed, and are thus caused to tighten their hold on the cable embraced between them.

Having described our invention, what we claim is—

The improved cable-coupling consisting of the tapered externally-screw-threaded spring-jaws A A, formed in one piece, with the intervening flexible loop, *a*, connecting said jaws at one end, and the nut *n*, working on the exterior of the opposite end of said jaws, substantially as described and shown.

In testimony whereof we have hereunto signed our names and affixed our seals, in the presence of two attesting witnesses, at Syracuse, in the county of Onondaga, in the State of New York, this 8th day of October. 1885.

HENRY F. GALE. [L. S.]
  LEWIS A. HAWLEY. [L. S.]

Witnesses:
  FREDERICK H. GIBBS,
  E. C. CANNON.